(12) United States Patent
Ootsuka

(10) Patent No.: US 7,025,101 B2
(45) Date of Patent: Apr. 11, 2006

(54) PNEUMATIC RADIAL TIRE WITH SPECIFIED TREAD PORTION BENDING RIGIDITY RATIO

(75) Inventor: Takashi Ootsuka, Kodaira (JP)

(73) Assignee: Bridgestone Corporation, Tokyo (JP)

(*) Notice: Subject to any disclaimer, the term of this patent is extended or adjusted under 35 U.S.C. 154(b) by 2 days.

(21) Appl. No.: 10/515,022

(22) PCT Filed: May 20, 2003

(86) PCT No.: PCT/JP03/06297

§ 371 (c)(1),
(2), (4) Date: Nov. 22, 2004

(87) PCT Pub. No.: WO03/099590

PCT Pub. Date: Dec. 4, 2003

(65) Prior Publication Data

US 2005/0205188 A1 Sep. 22, 2005

(30) Foreign Application Priority Data

May 24, 2002 (JP) .............................. 2002-150997

(51) Int. Cl.
*B60C 3/04* (2006.01)
*B60C 9/00* (2006.01)
*B60C 9/02* (2006.01)
*B60C 9/18* (2006.01)

(52) U.S. Cl. ...................... 152/454; 152/526; 152/548; 152/558

(58) Field of Classification Search ................ 152/454, 152/526, 527, 548, 556, 558
See application file for complete search history.

(56) References Cited

U.S. PATENT DOCUMENTS

| 4,657,058 | A | * | 4/1987 | Kabe et al. ................. 152/556 |
| 5,105,866 | A | | 4/1992 | Miwa |
| 6,520,232 | B1 | * | 2/2003 | Miyazaki et al. ........... 152/527 |

FOREIGN PATENT DOCUMENTS

| EP | 565339 A1 | 10/1993 |
| EP | 668172 A1 | 8/1995 |
| EP | 835766 A2 | 4/1998 |
| JP | 2-88307 A | 3/1990 |
| JP | 5-32103 A | 2/1993 |
| JP | 6-24207 A | 2/1994 |
| JP | 6-40210 A | 2/1994 |
| JP | 8-25910 A | 1/1996 |
| JP | 10-114203 A | 3/1998 |

* cited by examiner

Primary Examiner—Adrienne C. Johnstone
(74) Attorney, Agent, or Firm—Sughrue Mion, PLLC

(57) ABSTRACT

There is provided a pneumatic radial tire for a motorcycle capable of developing an excellent steering stability in a high-speed cornering subjected to a large camber angle, and having an aspect ratio of 0.50–0.85, in which a tensile strength at break of a carcass ply cord is not less than 980 MPa, and an absolute value of a carcass total rigidity obtained by adding carcass rigidities of carcass plies is not less than 30000, and a tensile strength at break of a belt layer cord is not less than 2350 MPa, and an absolute value of a belt total rigidity obtained by adding belt rigidities of belt layers is not less than 170000, and a bending rigidity ratio as a ratio of out-of-plane bending rigidity to in-plane bending rigidity is within a range of 4.20–9.10.

4 Claims, 4 Drawing Sheets

PNEUMATIC RADIAL TIRE WITH SPECIFIED TREAD PORTION BENDING RIGIDITY RATIO

TECHNICAL FIELD

This invention relates to a pneumatic radial tire suitable for a motorcycle conducting a high-speed cornering while contacting a side edge portion of a tire tread with ground, particularly a front wheel thereof, and more particularly it proposes a technique that a steering stability in the high-speed cornering is largely improved while sufficiently developing various performances such as a high-speed durability, a straight-running stability and the like.

BACKGROUND ART

In the cornering of the motorcycle on urban areas, when a certain camber angle is given to the tire, it is generally and widely conducted to contact a tread contacting face with ground under a condition that a position of surface width measured from an equatorial plane of the tire is limited to about 50–75% of a tread half-width.

Therefore, the pneumatic radial tire for the motorcycle exclusively used in the running on urban areas is possible to sufficiently develop the desired performances by giving a large camber angle without deeply pursuing optimization on various bending rigidities of a belt, a rigidity balance and the like, which highly exerts on the steering stability in the high-speed cornering while contacting the tread contacting face with ground up to a side edge position.

In recent years, however, the motorcycle is made to higher performances, and also special control areas for sporty running such as training field, circuit and the like, at where amateur riders can enjoy drastic sporty running while challenging to a limit of the steering technique, other than public roads are increasing. As the sporty running is readily enjoyed, the cornering at a high speed while largely inclining a vehicle body, or so-called large camber running is frequently conducted. In the tires based on the conventional belt design technique and the like, therefore, it is increasing to be a dissatisfaction that the steering stability in the high-speed cornering is lacking in such a large camber running.

The invention is to solve the above problems inherent to the conventional pneumatic motorcycle tire and to provide a pneumatic radial tire for a motorcycle capable of sufficiently developing various performances such as high-speed durability, straight-running stability and the like but also developing an excellent steering stability in the aforementioned large camber running.

DISCLOSURE OF THE INVENTION

The pneumatic radial tire for a motorcycle according to the invention is a tire comprising a pair of bead portions, a pair of sidewall portions, a tread portion toroidally extending and continuing to the sidewall portions, a carcass comprised of one or more carcass plies containing organic fiber cords each extended at an angle of 60–90° with respect to an equatorial plane of the tire, and a belt comprised of at least two belt layers each containing cords extended at an angle of 15–40° with respect to the equatorial plane and disposed at an outer peripheral side of a crown portion of the carcass so as to cross the cords of the layers with each other, and having an aspect ratio of 0.50–0.85, in which a tensile strength at break (Edci) of the carcass ply cord is not less than 980 MPa and an absolute value of a carcass total rigidity (Fc=ΣFci) obtained by adding a carcass rigidity (Fci) defined as a product of the tensile strength at break (Edci) and an end count (Emci) of the carcass ply cords per a length of 50 cm in the equatorial plane of the tire with respect to the respective carcass plies is not less than 30000, and a tensile strength at break (Edbj) of the belt layer cord is not less than 2350 MPa and an absolute value of a belt total rigidity (Fb=ΣFbj) obtained by adding a belt rigidity (Fbj) defined as a product of the tensile strength at break (Edbj) and an end count (Nmbj) of the belt layer cords per a length of 50 cm in the equatorial plane of the tire with respect to the respective belt layers is not less than 170000, and a bending rigidity ratio (Sb/Sa) of out-of-plane bending rigidity in a widthwise direction (Sb) to in-plane bending rigidity in a peripheral direction (Sa) in the tread portion is within a range of 4.20–9.10.

In the tread portion of such a tire, it is more preferable that the out-of-plane bending rigidity in the widthwise direction (Sb) is 3.92–6.86 N/mm and the in-plane bending rigidity in the peripheral direction (Sa) is 0.49–1.47 N/mm.

The term "aspect ratio" used herein is an "aspect ratio" defined in JATMA YEAR BOOK or a "NOMINAL ASPECT RATIO" defined in ETORTO STANDARD MANUAL.

Also, the in-plane bending rigidity in the peripheral direction of the tread portion (Sa) means a rigidity to a force acting to a peripheral component in the tread portion from a widthwise direction of the tread. Concretely, it can be determined by measuring and calculating (force/displacement) when a sample A of 15 mm in width formed by cutting a tread portion of a product tire in the peripheral direction of the tire as shown by a solid line in FIG. 1 is set to a measuring device as shown in FIG. 2 at a posture of directing cut faces up and down and a pushing force is applied to an up-side cut face.

On the other hand, the out-of-plane bending rigidity in the widthwise direction of the tread portion (Sb) means a rigidity to an external force acting to a widthwise component of the tread portion in a pushing direction of the tread contacting face. This rigidity can be determined by measuring and calculating (force/displacement) when a sample B of 15 mm in width formed by cutting a tread portion of a product tire in the widthwise direction of the tread as shown by a phantom line in FIG. 1 is set to a measuring device as shown in FIG. 2 at a posture of rendering the tread contacting face into an up-side face and a pushing force is applied to the up-side face.

The terms "rigidity" and "tensile strength at break" used herein mean values obtained by a given measurement at normal temperature of 25° C., respectively.

In the pneumatic radial tire for the motorcycle having the above construction, the tensile strength at break (Edci) of the carcass ply cord is made to not less than 980 MPa and the tensile strength at break (Edbj) of the belt layer cord is made to not less than 2350 MPa, whereby a desired tire case strength can be ensured without increasing the number of carcass plies, end count of the carcass ply cords and the like, and a belt strength enough to provide an excellent hoop effect in the high-speed running can be ensured without increasing the number of the belt layers and the like. In this case, therefore, the increase of tire weight can be prevented.

Also, the absolute value of the carcass total rigidity (Fc) is made to not less than 30000 and the absolute value of the belt total rigidity is made to not less than 170000, whereby a desired durability can be given to the tire. In other words, when the absolute value of the carcass total rigidity is less than 30000, it is difficult to ensure the straight-running stability and the steering stability in the high-speed cornering, while when the absolute value of the belt total rigidity is less than 170000, it is difficult to ensure the high-speed durability and the steering stability in the high-speed cornering.

Moreover, it is preferable that a rigidity ratio (|Fc/Fb|) as a ratio of absolute value of carcass total rigidity (Fc) to absolute value of belt total rigidity (Fb) is within a range of 0.10–0.50.

That is, when the belt rigidity is too high, there is a fear that the steering stability in the high-speed cornering lowers due to the rigidity difference to the carcass though the high-speed durability is improved, while when the belt rigidity is too low or when the carcass rigidity is too high, the high-speed durability lowers or the rigidity of a tire side portion becomes high to make kicking-back strong and there is a fear of lowering the straight-running stability, and also a peaky change of the cornering performance is liable to be easily caused. Therefore, it is preferable to ensure an excellent rigidity balance by selecting the rigidity ratio within the range of 0.10–0.50.

Particularly, in the running of the motorcycle, the ground contacting posture of the front wheeled tire is kaleidoscopically changed by the braking in the going into a corner, application of camber angle and handling in the cornering, straight-running after the passing through the corner and the like, or various inputs are repeatedly applied to the tire. In such a running, when operations such as application of a relatively small camber angle to the tire based on a little banking of a vehicle body, handling and braking are conducted together in the vicinity of an entrance of the corner, it is preferable that the in-plane bending rigidity of the tread portion in the peripheral direction (Sa) is made to not less than 0.49 N/mm for particularly ensuring the steering stability in the high-speed cornering.

In the cornering on the corner by mixing the violent banking of the vehicle body and the handling, in order to enhance the road holding property by flexibly deforming the tread crown portion based on a reaction force of a road surface, it is preferable that the out-of-plane bending rigidity of the tread portion in the widthwise direction (Sb) is restricted to not more than 6.86 N/mm. On the other hand, when the out-of-plane bending rigidity (Sb) is less than 3.92 N/mm, the rigidity comes short of.

Under the above viewpoint, when the value of the in-plane bending rigidity of the tread portion in the peripheral direction (Sa) exceeds 1.47 N/mm, the flexible contacting of the tread crown portion with ground is obstructed if the out-of-plane bending rigidity (Sb) is within the above selected range.

In order to balancedly ensure the adequate rigidity of the tread crown portion and the adequate flexibility, it is required that the above bending rigidities of the tread portion are set in the proper range but also the ratio of these bending rigidities (Sb/Sa) is set in a range of 4.20–9.10.

That is, when the ratio is less than 4.20, it is difficult to ensure the straight-running property, while when it exceeds 9.10, it is difficult to ensure the steering stability in the high-speed running.

BEST MODE FOR CARRYING OUT THE INVENTION

Figure 3:
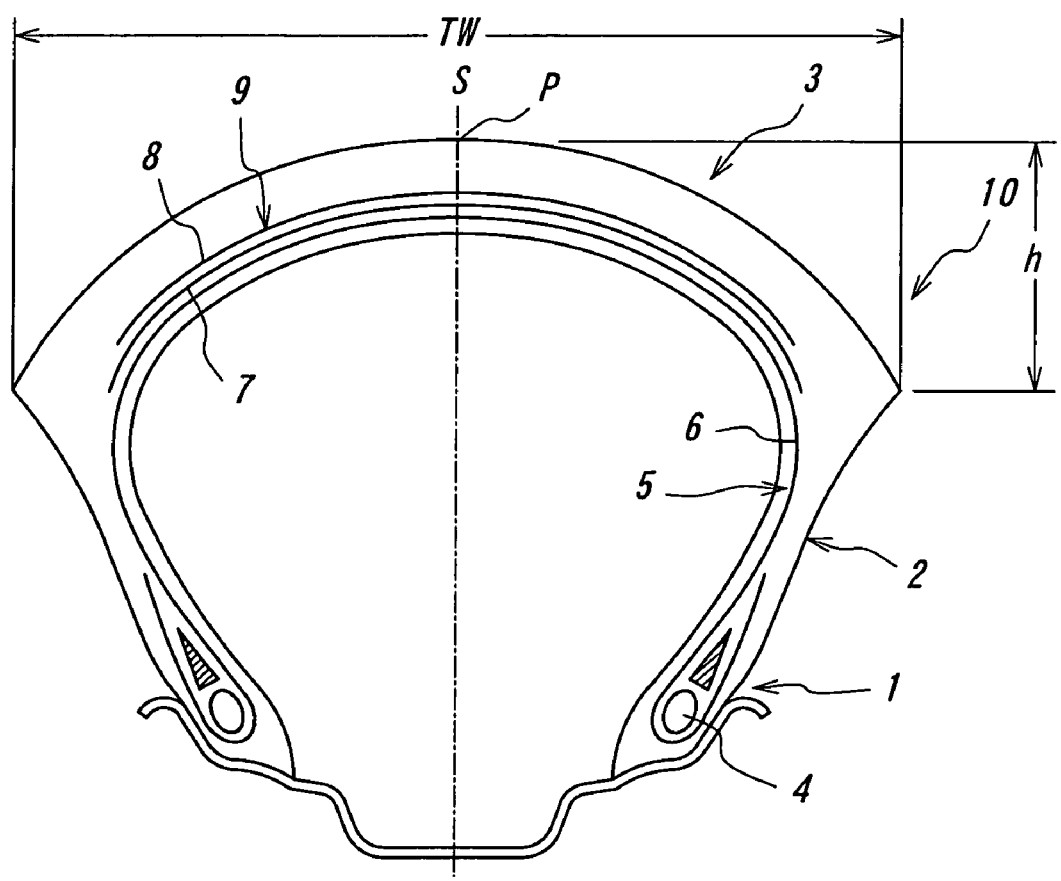
FIG. 3 is a section view in a widthwise direction of a tread according to an embodiment of the invention.

In an embodiment of the invention shown in FIG. 3, numeral 1 is a pair of bead portions, numeral 2 a sidewall portion continuing to each of the bead portions 1 and extending outward therefrom in a radial direction, and numeral 3 a tread portion toroidally extending and continuing to each of the sidewall portions. The illustrated tire has an aspect ratio of 0.50–0.85.

A radial carcass 5 reinforcing the above portions 1, 2, 3 is arranged so as to toroidally extend between bead cores 4 arranged in the respective bead portions 1. The carcass 5 is comprised of at least one carcass ply 6 containing organic fiber cords each extended at an angle of 60–90° with respect to an equatorial plane S of the tire.

On an outer peripheral side of a crown portion of the radial carcass 5 is arranged a belt 9 comprised of two or more belt layers 7, 8 in which belt layer cords are crossed with each other between these layers, preferably these cords extend in a direction opposite to each other with respect to the equatorial plane of the tire and an angle of the belt layer cord with respect to the equatorial plane S of the tire is within a range of 15–40°.

The organic fiber cord constituting the carcass ply 6, i.e. the carcass ply cord has a tensile strength at break (Edci) of not less than 980 MPa, while an absolute value of a carcass total rigidity obtained by adding a carcass rigidity (Fci) defined as a product of the tensile strength at break (Edci) and an end count (Emci) of the carcass ply cords per a length of 50 cm in the equatorial plane of the tire with respect to the respective carcass plies 6 is set in not less than 30000.

In addition, the cord of each belt layer has a tensile strength at break (Edbj) of not less than 2350 MPa, while an absolute value of a belt total rigidity (Fb) obtained by adding a belt rigidity (Fbj) defined as a product of the tensile strength at break (Edbj) and an end count (Nmbj) of the belt layer cords per a length of 50 cm in the equatorial plane of the tire with respect to the respective belt layers 7, 8 is set in not less than 170000.

Moreover, the rigidity ratio (|Fc/Fb|) as a ratio of absolute value of carcass total rigidity to absolute value of belt total rigidity is set in a range of 0.10–0.50.

Figure 1:
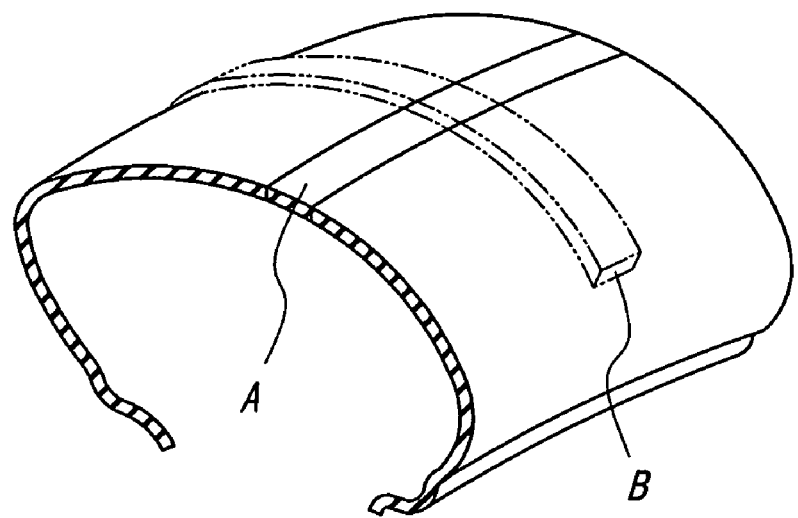
FIG. 1 is a view showing a method of cutting out a sample for the measurement of bending rigidity.
Figure 2:
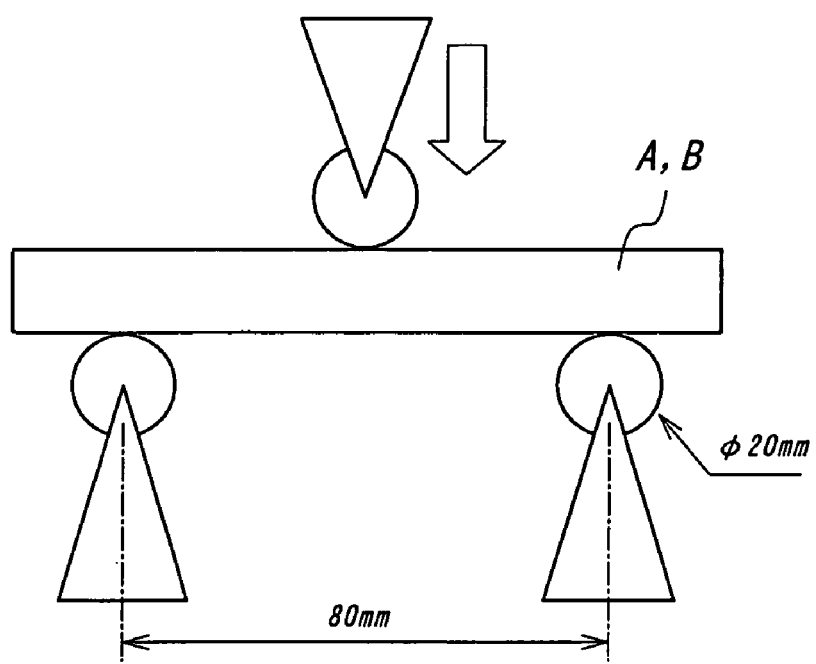
FIG. 2 is a schematic view illustrating an apparatus for the measurement of bending rigidity.

In the tread portion 3, as previously mentioned in relation to FIGS. 1 and 2, the in-plane bending rigidity in the peripheral direction (Sa) is set in a range of 0.49–1.47 N/mm, and the out-of-plane bending rigidity in the widthwise direction (Sb) is set in a range of 3.92–6.86 N/mm, while the rigidity ratio (Sb/Sa) as a ratio of out-of-plane bending rigidity (Sb) to in-plane bending rigidity (Sa) is set in a range of 4.20–9.10.

According to the pneumatic tire for the motorcycle having the above construction, the development of high steering stability in the large camber running can be guaranteed by selecting the tensile strength at break of the respective cord, various rigidities and rigidity ratio within the above ranges without increasing the tire weight and with the sufficient securement of basic performances such as excellent high-speed durability, straight-running property and the like.

Moreover, it is preferable in such a tire that when the tire is assembled onto a rim defined by a standard of JATMA YEAR BOOK, ETORTO STANDARDS MANUAL or the like and an air pressure defined by the same standard is filled in the tire, a tread curvature under no load as a ratio of a distance h in radial direction from a tire outermost point P on the equatorial plane S to a position of a tread maximum width to a tread maximum width TW equal to a tire maximum width in the figure is set to not less than 0.23 but not more than 0.5.

That is, when the curvature is less than 0.23, the ground contacting property in the cornering lowers and it is difficult to ensure the stability in the cornering, while when it exceeds 0.50, there is a fear that it is difficult to generate sufficient lateral force.

EXAMPLE 1

An actual running test is carried out by a motorcycle using a front wheel tire having a tire size of 120/70 ZR17 (rim width: 3.50 inch, internal pressure: 206 kPa) and a rear wheel tire having a tire size of 190/55 ZR17 (rim width: 6.00 inch, internal pressure: 186 kPa). In this test, when an out-of-plane bending rigidity in the widthwise direction is variously changed in the tread portion of the front wheel tire, the steering stability in the high-speed cornering is evaluated by a driver's feeling to obtain results as shown by a graph in FIG. 4.

In this case, the cornering speed is 120 km/h, and as the index of the steering stability becomes larger, the result is better.

In the graph, a comparative tire of the following Table 1 is a control tire and the performance thereof is 100 as an index.

Figure 4:
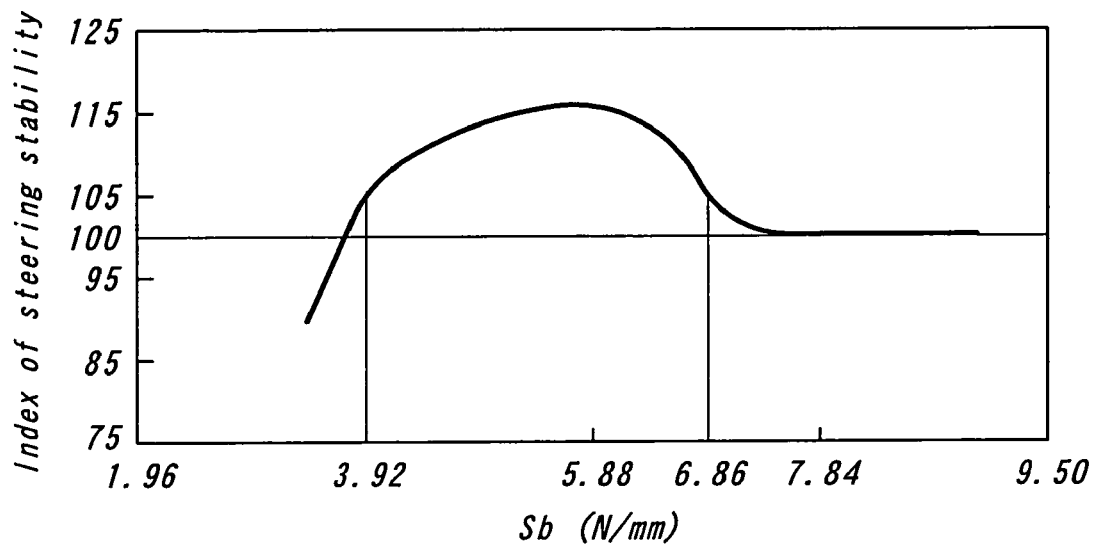
FIG. 4 is a graph showing a change of steering stability to an out-of-plane bending rigidity in a widthwise direction of a tread portion.

According to FIG. 4, when the out-of-plane bending rigidity (Sb) exceeds 6.86 N/mm, the steering stability lowers to the same extent as the control tire resulted from the lowering of the road holding property of the tire. While, when the out-of-plane bending rigidity is less than 3.92 N/mm, the lowering of the steering stability become conspicuous due to the lacking of the rigidity.

EXAMPLE 2

Figure 5:
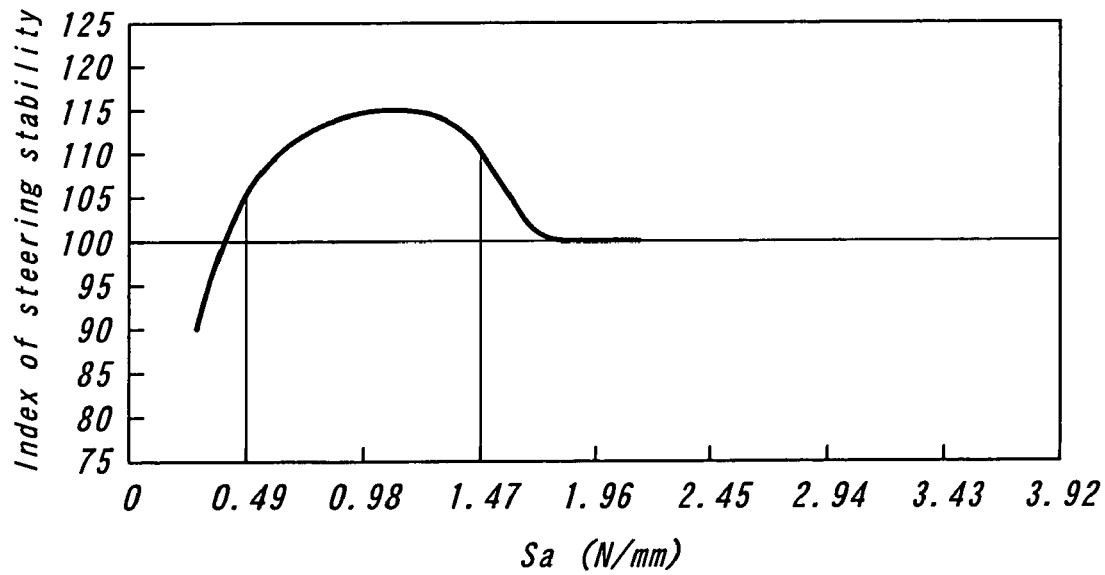
FIG. 5 is a graph showing a change of steering stability to an in-plane bending rigidity in a peripheral direction of a tread portion.

A change of the steering stability when the in-plane bending rigidity in the radial direction (Sa) is variously changed in the tread portion of the front wheel tire is measured in the same manner as in Example 1 to obtain results as shown by a graph in FIG. 5.

In this case, the comparative tire of Table 1 is also control, and the performance thereof is 100 as an index.

According to FIG. 5, when the in-plane bending rigidity (Sa) is not less than 0.49 N/mm, an excellent steering stability in the cornering can be developed as compared with the control tire, while when it exceeds 1.47 N/mm, the soft contact of the tread crown portion with ground is obstructed and it is obliged to cause the violent lowering of the steering stability.

EXAMPLE 3

Figure 6:
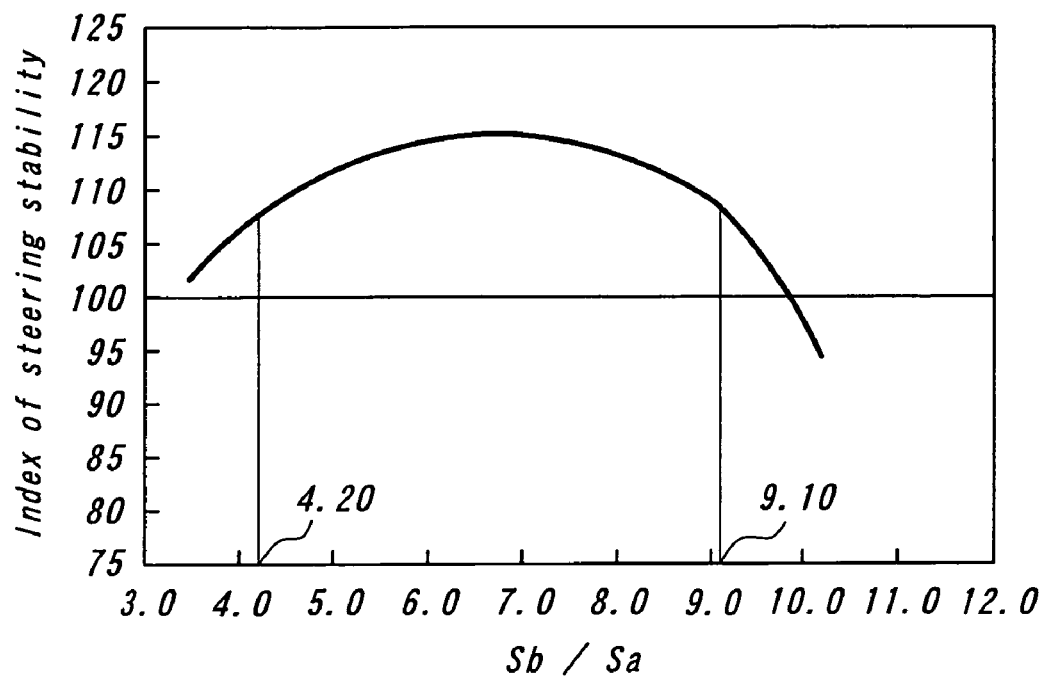
FIG. 6 is a graph showing a change of steering stability to a bending rigidity ratio.

A change of the steering stability by changing the bending rigidity ratio (Sb/Sa) in the tread portion of the front wheel tire is measured in the same manner as in Example 1 to obtain results as shown in FIG. 6.

In this case, the control tire is also the comparative tire of Table 1, and the performance thereof is 100 as an index.

As seen from FIG. 6, when the bending rigidity ratio (Sb/Sa) exceeds 9.10, the steering stability violently lowers to an extent lower than that of the control tire, and the similar tendency is caused even when it is less than 4.20.

EXAMPLE 4

Figure 7:
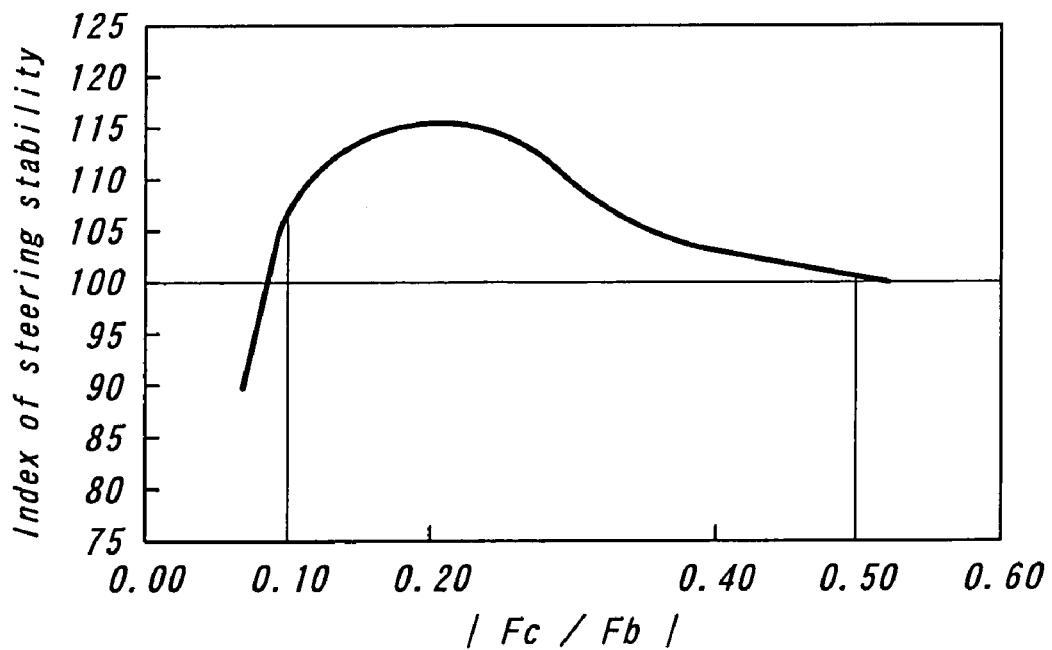
FIG. 7 is a graph showing a change of steering stability to a rigidity ratio between carcass and belt.

A change of the steering stability by changing the rigidity ratio (|Fc/Fb|) as a ratio of absolute value of carcass total rigidity to absolute value of belt total rigidity (Fb) is measured in the same manner as in Example 1 to obtain results as shown in FIG. 7.

In this case, the control tire is the comparative tire of Table 1.

As seen from FIG. 7, when the rigidity ratio (|Fc/Fb|) is not less than 0.10, the steering stability is largely improved, while when it exceeds 0.50, the steering stability lowers to the same extent as in the control tire.

EXAMPLE 5

An actual running test is carried out by a motorcycle using a front wheel tire having a tire size of 120/70 ZR17 (rim width: 3.50 inch, internal pressure: 206 kPa) and a rear wheel tire having a tire size of 190/55 ZR17 (rim width: 6.00 inch, internal pressure: 186 kPa), in which the steering stability in the high-speed turning is evaluated by a driver's feeling to obtain results shown in Table 1.

In Table 1 are also shown constitutional forms of an example tire and a comparative tire used as a front wheel tire, respectively.

TABLE 1

| | Front wheel tire | |
|---|---|---|
| | Example tire | Comparative tire |
| Aspect ratio | 0.70 | 0.70 |
| Carcass | one ply | one ply |
| Cord | nylon | nylon |
| Tensile strength at break Edci | 980 MPa | 980 MPa |
| Angle (to peripheral direction of tire) | 90° | 90° |
| Carcass total rigidity Fc (absolute value) | 70000 | 70000 |
| Belt | three layers | two layers |
| Cord | aramid | aramid |
| Tensile strength at break Edbj | 2800 MPa | 2800 MPa |
| Angle (to peripheral direction of tire) | 30° | 23° |
| Belt total rigidity Fb (absolute value) | 300000 | 200000 |
| In-plane bending rigidity in peripheral direction Sa | 1.078 N/mm | 2.156 N/mm |
| Out-of-plane bending rigidity in widthwise direction Sb | 5.39 N/mm | 9.212 N/mm |
| Tread curvature Rc | 0.23 | 0.22 |
| Steering stability in high-speed cornering Feeling evaluation (the larger the index value, the better) | 115 | 100 |

As seen from Table 1, the example tire can largely improve the steering stability in the high-speed cornering because various rigidity requirements and the like are satisfied.

INDUSTRIAL APPLICABILITY

As seen from the above, according to the invention, the high steering stability can be developed even when the tire is subjected to a large camber angle enough to contact the side edge portion of the tread contacting area with ground.

The invention claimed is:

1. A tire comprising a pair of bead portions, a pair of sidewall portions, a tread portion toroidally extending and continuing to the sidewall portions, a carcass comprised of one or more carcass plies containing organic fiber cords each extended at an angle of 60–90° with respect to an equatorial plane of the tire, and a belt comprised of at least two belt layers each containing cords extended at an angle of 15–40° with respect to the equatorial plane and disposed at an outer peripheral side of a crown portion of the carcass so as to cross the cords of the layers with each other, and having an aspect ratio of 0.50–0.85, in which a tensile strength at break (Edci) of the carcass ply cord is not less than 980 MPa and an absolute value of a carcass total rigidity (Fc=ΣFci) obtained by adding a carcass rigidity (Fci) defined as a product of the tensile strength at break (Edci) and an end count (Emci) of the carcass ply cords per a length of 50 cm in the equatorial plane of the tire with respect to the respective carcass plies is not less than 30000, and a tensile strength at break (Edbj) of the belt layer cord is not less than 2350 MPa and an absolute value of a belt total rigidity (Fb=ΣFbj) obtained by adding a belt rigidity (Fbj) defined as a product of the tensile strength at break (Edbj) and an end count (Nmbj) of the belt layer cords per a length of 50 cm in the equatorial plane of the tire with respect to the respective belt layers is not less than 170000, and a bending rigidity ratio (Sb/Sa) of out-of-plane bending rigidity in a widthwise direction (Sb) to in-plane bending rigidity in a peripheral direction (Sa) in the tread portion is within a range of 4.20–9.10.

2. A pneumatic radial tire for a motorcycle according to claim 1, wherein the out-of-plane bending rigidity in the widthwise direction (Sb) is 3.92–6.86 N/mm and the in-plane bending rigidity in the peripheral direction (Sa) is 0.49–1.47 N/mm.

3. A pneumatic radial tire for a motorcycle according to claim 2, wherein a rigidity ratio (|Fc/Fb|) as a ratio of absolute value of carcass total rigidity (Fc) to absolute value of belt total rigidity (Fb) is within a range of 0.10–0.50.

4. A pneumatic radial tire for a motorcycle according to claim 1, wherein a rigidity ratio (|Fc/Fb|) as a ratio of absolute value of carcass total rigidity (Fc) to absolute value of belt total rigidity (Fb) is within a range of 0.10–0.50.

* * * * *